(12) United States Patent
Chen (10) Patent No.: US 10,834,892 B2
(45) Date of Patent: Nov. 17, 2020

(54) PET PAD AND PET CARRIER

(71) Applicant: Li-Chen Chen, Tainan (TW)

(72) Inventor: Li-Chen Chen, Tainan (TW)

( * ) Notice: Subject to any disclaimer, the term of this patent is extended or adjusted under 35 U.S.C. 154(b) by 243 days.

(21) Appl. No.: 16/101,727

(22) Filed: Aug. 13, 2018

(65) Prior Publication Data

US 2019/0150397 A1 May 23, 2019

(30) Foreign Application Priority Data

Nov. 22, 2017 (TW) .............................. 106217345 U (51) Int. Cl.
| | |
|---|---|
| *A01K 1/00* | (2006.01) |
| *A01K 1/015* | (2006.01) |
| *A01K 1/01* | (2006.01) |
| *A01K 1/02* | (2006.01) |

(52) U.S. Cl.
CPC .......... *A01K 1/0157* (2013.01); *A01K 1/0107* (2013.01); *A01K 1/0236* (2013.01)

(58) Field of Classification Search
CPC ................................ A01K 1/00; A01K 1/0157
USPC .................... 119/161, 165–170, 526
See application file for complete search history.

(56) References Cited

U.S. PATENT DOCUMENTS

| | | | | | |
|---|---|---|---|---|---|
| 5,630,376 A | * | 5/1997 | Ochi | ..................... | A01K 1/0107 119/169 |
| 6,059,247 A | * | 5/2000 | Olivadoti | ............. | A01K 1/0107 248/346.04 |
| 6,244,216 B1 | * | 6/2001 | Ochi | ..................... | A01K 1/0107 119/169 |
| 6,550,423 B1 | * | 4/2003 | Pope | ..................... | A01K 1/0107 119/161 |
| 7,249,570 B1 | * | 7/2007 | Roberson | ............. | A01K 1/0157 119/169 |
| 8,101,815 B2 | * | 1/2012 | Kaneko | ................ | A01K 1/0107 119/169 |
| 8,468,973 B2 | * | 6/2013 | Sasano | ................. | A01K 1/0157 119/171 |
| 2005/0166855 A1 | * | 8/2005 | Kaneko | ................ | A01K 1/0157 119/169 |
| 2005/0166856 A1 | * | 8/2005 | Kaneko | ................ | A01K 1/0107 119/169 |
| 2010/0154716 A1 | * | 6/2010 | Smith | .................. | A01K 1/0107 119/169 |

(Continued)

*Primary Examiner* — Richard T Price, Jr.
(74) *Attorney, Agent, or Firm* — Li & Cai Intellectual Property (USA) Office (57) ABSTRACT

A pet pad includes a pad body and a liquid permeable sheet body. The pad body is sheet shaped and has a carrying surface. The carrying surface has a mating portion. The liquid permeable sheet body has a liquid permeable portion and an annular portion circumferentially connected to a periphery of the liquid permeable portion. The annular portion includes a fixing segment and a positioning segment. The fixing segment is fixed to the carrying surface, the positioning segment is detachably positioned on the mating portion, and a length of the fixing segment is greater than a length of the positioning segment. The positioning segment is capable of being separated from the mating portion to form an opening, and the pet pad is configured to provide a moisture absorbing sheet body to be placed between the liquid permeable sheet body and the pad body through the opening.

10 Claims, 11 Drawing Sheets

(56) References Cited

U.S. PATENT DOCUMENTS

2010/0175626 A1\* 7/2010 Askinasi .............. A01K 1/0107
119/169

\* cited by examiner

PET PAD AND PET CARRIER

BACKGROUND OF THE INVENTION

1. Field of the Invention

The present disclosure relates to a pet product, and in particular, to a pet pad and a pet carrier.

2. Description of Related Art

Conventional pet pads can be used to provide pets, such as dogs or cats, to sit thereon, and to rest or play thereon. However, the conventional pet pads do not have the function of receiving pet urine. When a pet wants to urinate, the owner of the pet has to take the pet to another place to urinate. Moreover, in some special situations, such as placing a pet pad in a pet stroller, if the pet cannot help but urinate directly on the pet pad, it will be troublesome for the owner to clean up.

In addition, although potty pads that can receive pet urine are available on the market, none of them have a cushion function and are usually discarded after use. Even if the potty pad is placed on the pet pad, the potty pad may slip off the pet pad when the pet plays or rolls thereon, thus causing the potty pad to lose the function of receiving the pet urine.

In this regard, the present disclosure provides a pet pad and a pet carrier to overcome the aforementioned drawbacks.

SUMMARY OF THE INVENTION

The main object of the present disclosure is to solve the drawbacks associated with the prior art.

The present disclosure provides a pet pad which includes a pad body and a liquid permeable sheet body. The pad body is in a sheet shape and has a carrying surface, in which the carrying surface has a mating portion. The liquid permeable sheet body has a liquid permeable portion and an annular portion circumferentially connected to a periphery of the liquid permeable portion, and the annular portion includes a fixing segment and a positioning segment, in which the fixing segment is fixed to the carrying surface of the pad body, the positioning segment is detachably positioned on the mating portion of the pad body, and a length of the fixing segment is greater than a length of the positioning segment. The positioning segment of the liquid permeable sheet body is capable of being separated from the mating portion of the carrying surface to form an opening, and the pet pad is configured to provide a moisture absorbing sheet body to be placed and flatly sandwiched between the liquid permeable sheet body and the pad body through the opening.

The present disclosure also provides a pet carrier which includes a pet carrying portion and a pet pad. The pet pad is disposed on the pet carrying portion, and the pet pad includes a pad body and a liquid permeable sheet body. The pad body is in a sheet shape and has a carrying surface, in which the carrying surface has a mating portion. The liquid permeable sheet body has a liquid permeable portion and an annular portion circumferentially connected to a periphery of the liquid permeable portion, and the annular portion includes a fixing segment and a positioning segment, in which the fixing segment is fixed to the carrying surface of the pad body, the positioning segment is detachably positioned on the mating portion of the pad body, and a length of the fixing segment is greater than a length of the positioning segment. The positioning segment of the liquid permeable sheet body is capable of being separated from the mating portion of the carrying surface to form an opening, and the pet pad is configured to provide a moisture absorbing sheet body to be placed and flatly sandwiched between the liquid permeable sheet body and the pad body through the opening. In addition, the pad body of the pet pad is disposed between the liquid permeable sheet body and the pet carrying portion.

The advantage of the present disclosure is that the pet pad and the pet carrier of the present disclosure enable a user to easily place and flatly sandwich the moisture absorbing sheet body between the liquid permeable sheet body and the pad body through the structural design of the liquid permeable portion, the fixing segment, and the positioning segment of the liquid permeable sheet body, and through the relationship between the positioning segment and the mating portion (i.e., the positioning segment is capable of being separated from the mating portion to form an opening). In addition, when the moisture absorbing sheet body is used up (i.e., when the moisture absorbing sheet body is no longer able to absorb the pet urine), the user can easily remove and change the moisture absorbing sheet body from the pet pad through the opening.

For further understanding of the present disclosure, the following embodiments are provided to facilitate the disclosure of the present disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

Referring to FIGS. 1 to 11, which are embodiments of the present disclosure. It should be noted that, the relevant numbers and appearances of each of the embodiments corresponding to the drawings are merely used to specifically describe the embodiments to understand the present disclosure, and is not used to limit the protection scope of the present disclosure.

[Pet Pad]

Referring to FIGS. 1 to 9, an embodiment of the present disclosure discloses a pet pad 100. The pet pad 100 includes a pad body 1 and a liquid permeable sheet body 2 disposed on the pad body 1. The specific structures of the components of the pet pad 100 will be respectively described below, and then the connection relationship between the components of the pet pad 100 will be described.

Figure 1:
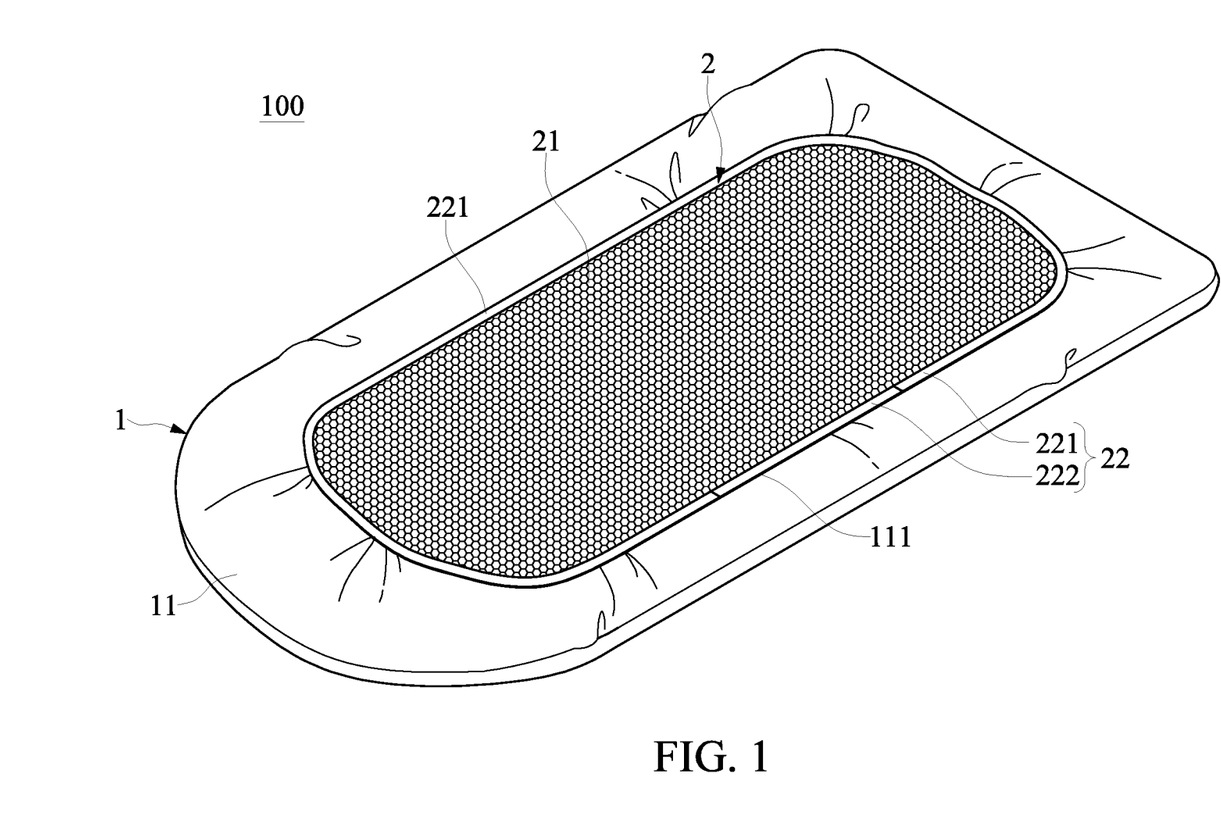
FIG. 1 is a perspective view showing a pet pad in a rectangular shape according to an embodiment of the present disclosure.
Figure 2:
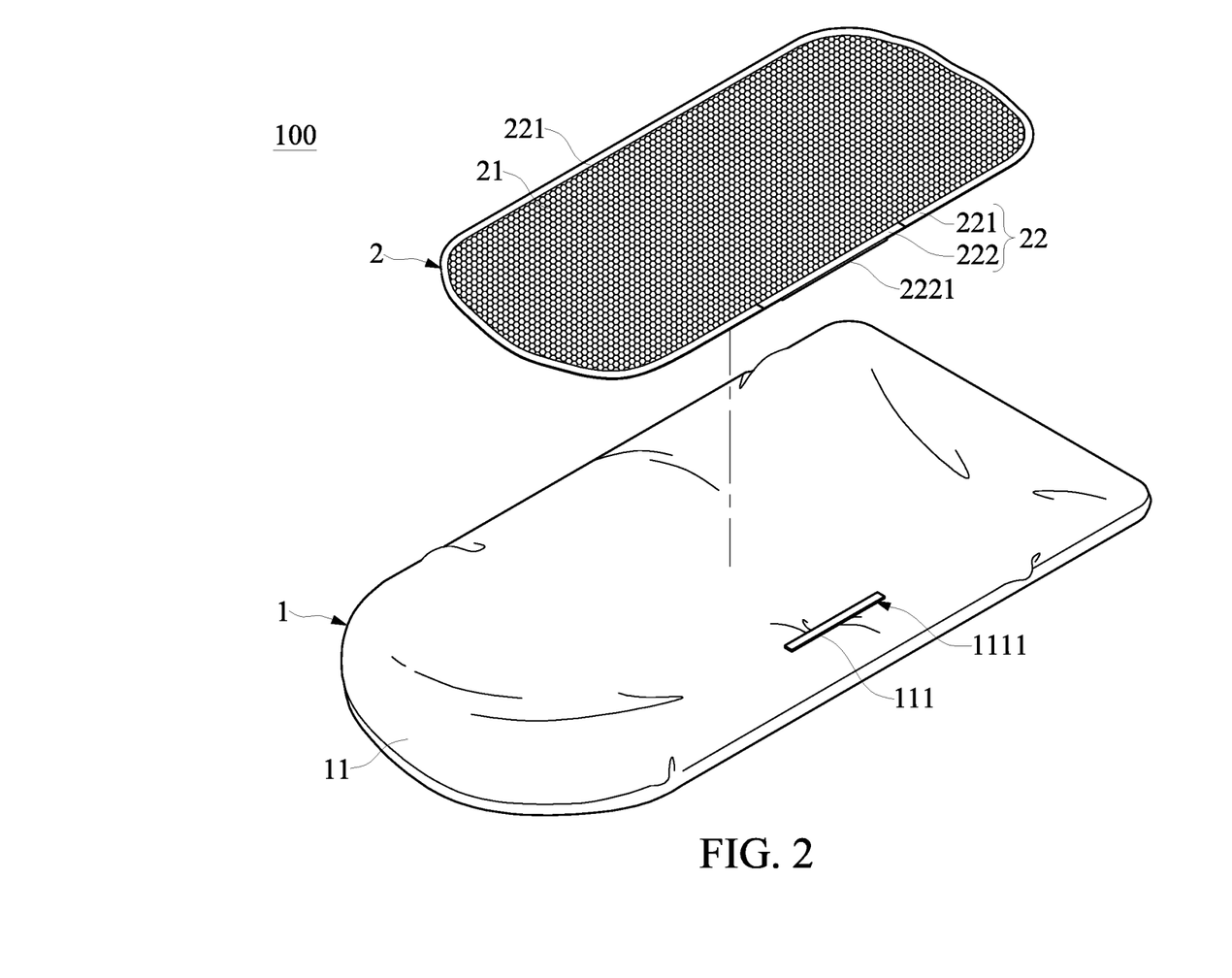
FIG. 2 is an exploded view of FIG. 1.

Referring to FIGS. 1 and 2, the pad body 1 is in a sheet shape and has a carrying surface 11, and the carrying surface 11 has a mating portion 111. The carrying surface 11 is configured to allow the liquid permeable sheet body 2 to be disposed thereon, and to provide a pet, such as a dog or a cat, to sit thereon. The mating portion 111 includes a positioning member 1111. More specifically, the pad body 1 of the present embodiment preferably has a certain thickness and elasticity so as to allow the pet to comfortably sit on the carrying surface 11 of the pad body 1. In addition, to prevent the pet urine from contaminating the interior of the pad body 1, the pad body 1 of the present embodiment preferably adopts a waterproof pad body made of waterproof oxford nylon material or PVC material, but the present disclosure is not limited thereto.

Referring to FIGS. 1 to 5, the liquid permeable sheet body 2 has a liquid permeable portion 21 and an annular portion 22 circumferentially connected to a periphery of the liquid permeable portion 21 (as shown in FIGS. 1 and 2). The annular portion 22 includes a fixing segment 221 and a positioning segment 222. The fixing segment 221 is fixed to the carrying surface 11 of the pad body 1, the positioning segment 222 is detachably positioned on the mating portion 111 of the pad body 1, and a length of the fixing segment 221 is greater than a length of the positioning segment 222.

Figure 3:
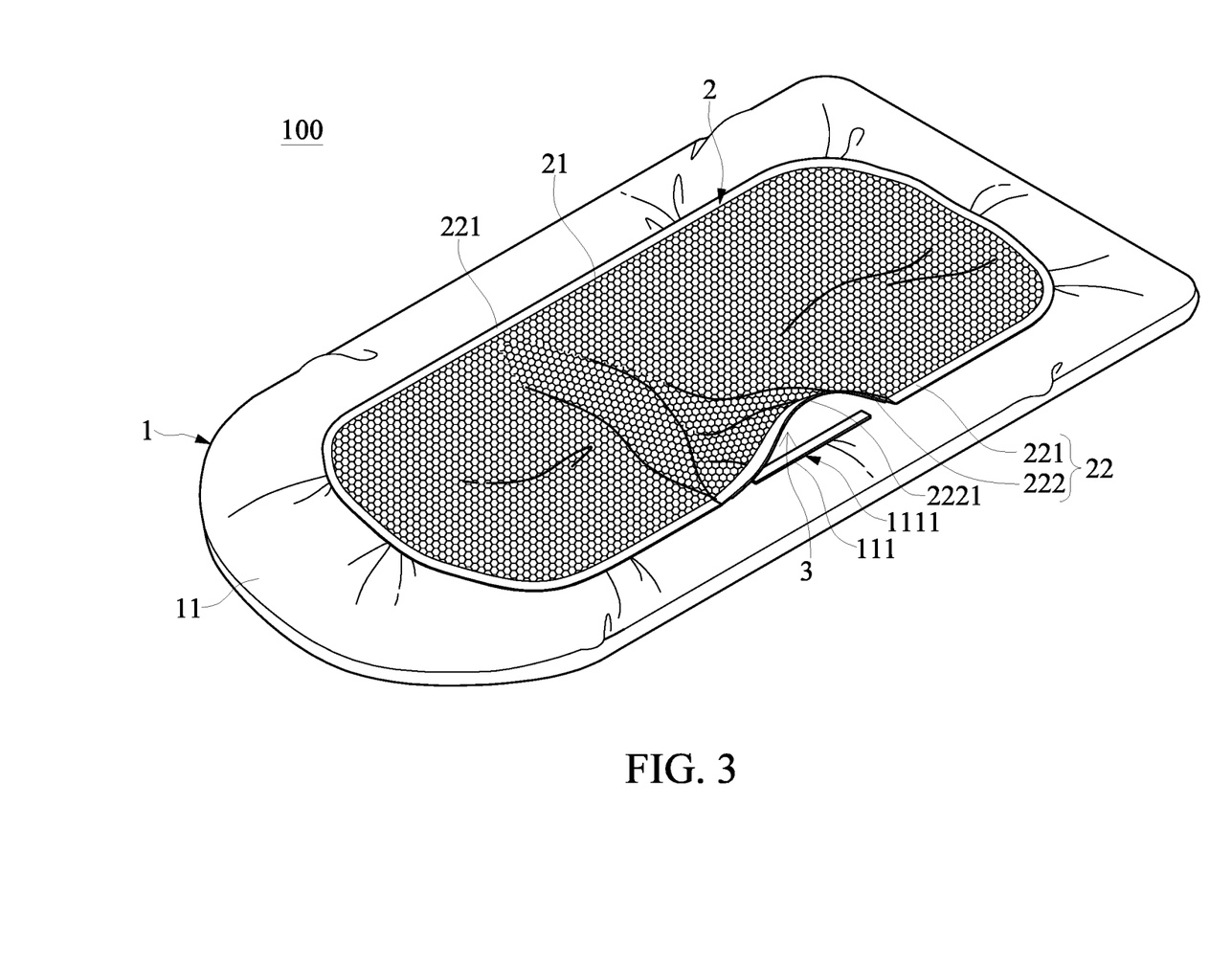
FIG. 3 is a schematic view showing a positioning segment being separated from a mating portion to form an opening according to the embodiment of the present disclosure.
Figure 4:
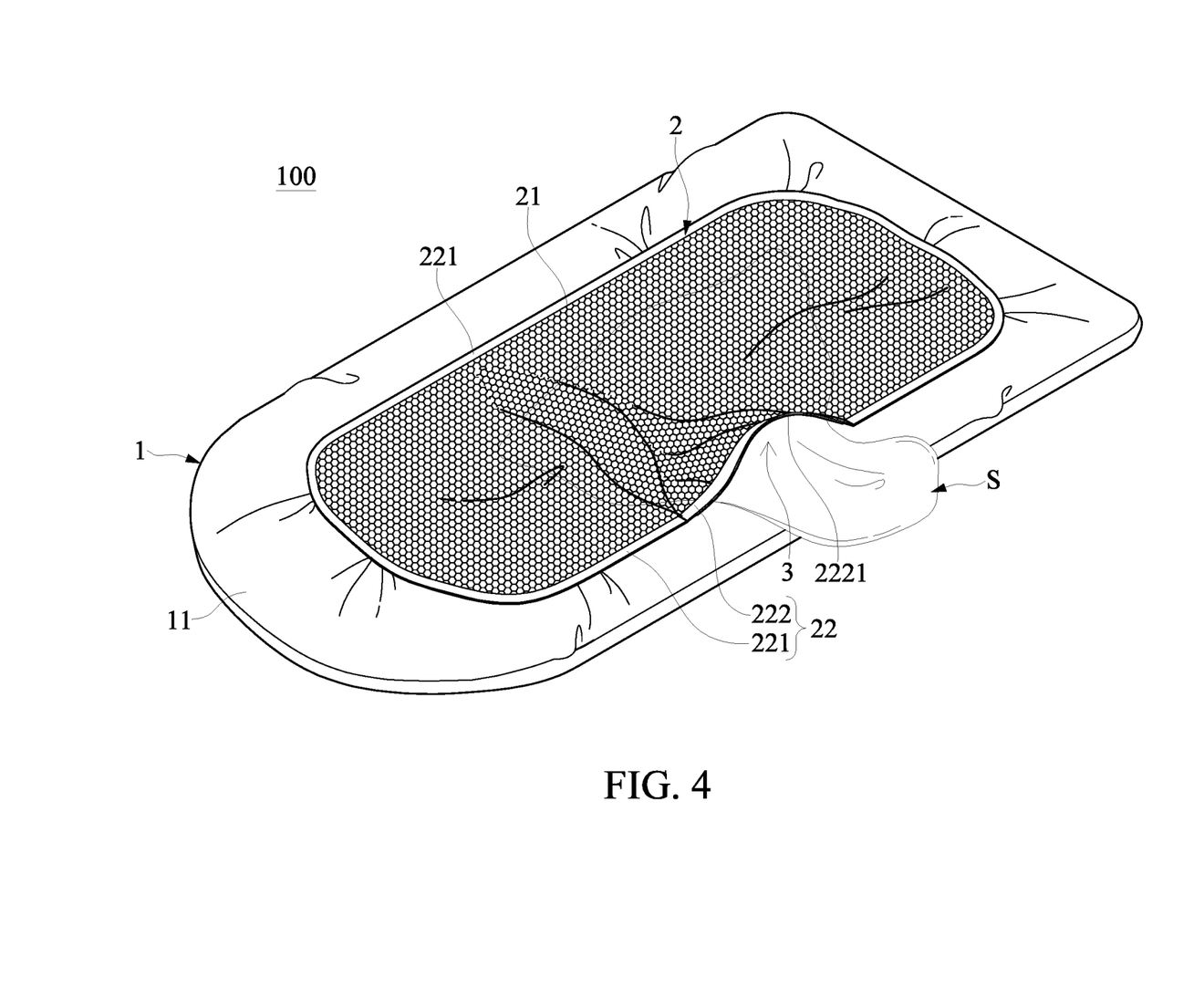
FIG. 4 is a schematic view showing a moisture absorbing sheet body being placed between a liquid permeable sheet body and a pad body through the opening according to the embodiment of the present disclosure.
Figure 5:
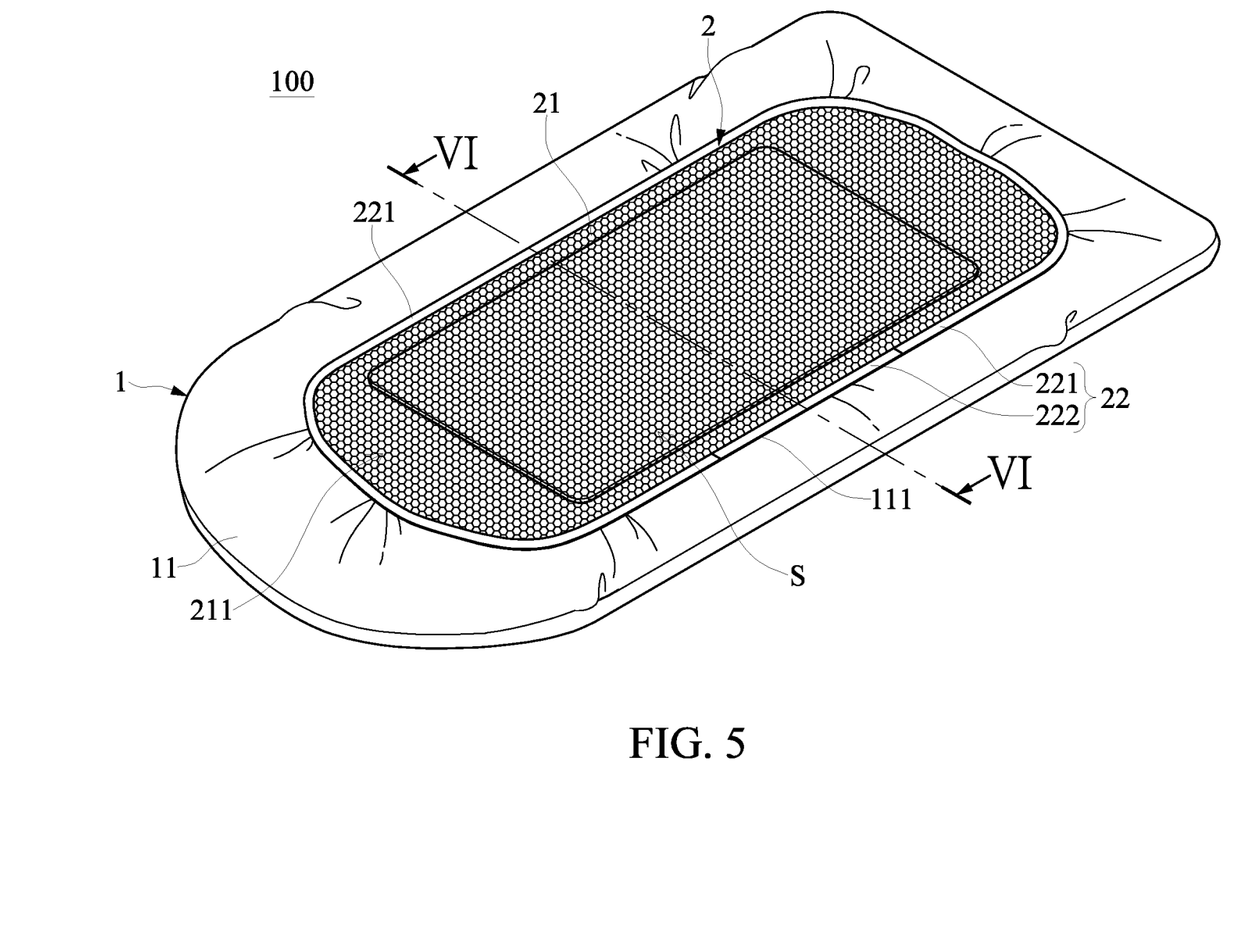
FIG. 5 is a schematic view showing the moisture absorbing sheet body being flatly sandwiched between the liquid permeable sheet body and the pad body according to the embodiment of the present disclosure.

The positioning segment 222 of the liquid permeable sheet body 2 is capable of being separated from the mating portion 111 of the carrying surface 11 to form an opening 3 (as shown in FIG. 3), and the pet pad 100 is configured to provide a moisture absorbing sheet body S to be placed and flatly sandwiched between the liquid permeable sheet body 2 and the pad body 1 through the opening 3 (as shown in FIGS. 4 and 5). In the present embodiment, the moisture absorbing sheet body S may be a pet diaper or a moisture absorbing fabric, but the present disclosure is not limited thereto.

Accordingly, the pet pad 100 of the present embodiment enables a user to easily place and flatly sandwich the moisture absorbing sheet body S between the liquid permeable sheet body 2 and the pad body 1 through the structural design of the liquid permeable portion 21, fixing segment 221, and the positioning segment 222 of the liquid permeable sheet body 2, and through the relationship between the positioning segment 222 and the mating portion 111 (i.e., the positioning segment 222 is capable of being separated from the mating portion 111 to form an opening 3). In addition, when the moisture absorbing sheet body S is used up (i.e., when the moisture absorbing sheet body S is no longer able to absorb the pet urine), the user can easily remove and change the moisture absorbing sheet body S from the pet pad 100 through the opening 3. Therefore, the pet pad 100 of the present embodiment not only functions as a cushion, but also functions as a potty pad, thereby increasing the functionality and practicability of the product.

Figure 6:
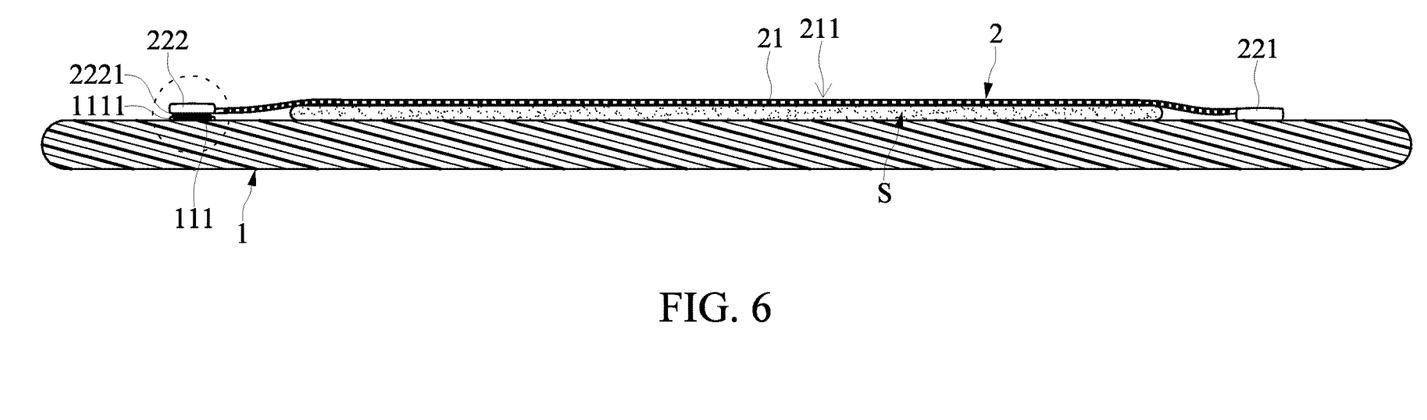
FIG. 6 is a cross-sectional view taken along a cross-sectional line VI-VI of FIG. 5.

Referring to FIGS. 5 and 6, the liquid permeable portion 21 of the liquid permeable sheet body 2 of the present embodiment has a mesh-like structure and has a plurality of liquid permeable holes 211, and when the moisture absorbing sheet body S is placed and flatly sandwiched between the liquid permeable sheet body 2 and the pad body 1, at least part of the liquid permeable holes 211 are configured to allow a liquid (i.e. pet urine) to penetrate so that the liquid is absorbed by the moisture absorbing sheet body S. It is worth mentioning that since the commercially available breathable mesh also has a mesh-like structure and has a plurality of holes, the liquid permeable sheet body 2 of the present embodiment preferably adopts the breathable mesh, but the present disclosure is not limited thereto.

Accordingly, the pet pad 100 of the present embodiment enables the liquid to penetrate through the part of the liquid permeable holes 211 and to be absorbed by the moisture absorbing sheet body S by virtue of the mesh-like structure of the liquid permeable portion 21 of the liquid permeable sheet body 2 and the liquid permeable holes 211. In addition, the structure of the liquid permeable portion 21 can prevent the moisture absorbing sheet body S from slipping off the pad body 1 when the pet is playing or rolling on the pet pad 100. The structure of the liquid permeable portion 21 also enables the user to observe the state of the moisture absorbing sheet body S (i.e., whether the moisture absorbing sheet body S has absorbed excess liquid) through the liquid permeable holes 211 to determine whether to change the moisture absorbing sheet body S.

Referring to FIGS. 5 and 6, in the present embodiment, a thickness of the pad body 1 is greater than a thickness of the liquid permeable sheet body 2, and an elasticity of the pad body 1 is greater than an elasticity of the liquid permeable sheet body 2. Preferably, the length of the positioning segment 222 is less than one-third of the length of the fixing segment 221, and the length of the positioning segment 222 is between 5 cm and 40 cm.

Accordingly, the pet pad 100 of the present embodiment enables the liquid permeable sheet body 2 to have a better fixing effect on the moisture absorbing sheet body S since the length of the positioning segment 222 is less than one-third of the length of the fixing segment 221. In addition, since the length of the positioning segment 222 is between 5 cm and 40 cm (roughly equal to a width of a palm), the user can easily pass his hand through the opening 3 and flatten the moisture absorbing sheet body S when the positioning segment 222 of the liquid permeable sheet body 2 is separated from the mating portion 111 of the carrying surface 11 to form the opening 3.

Figure 7:
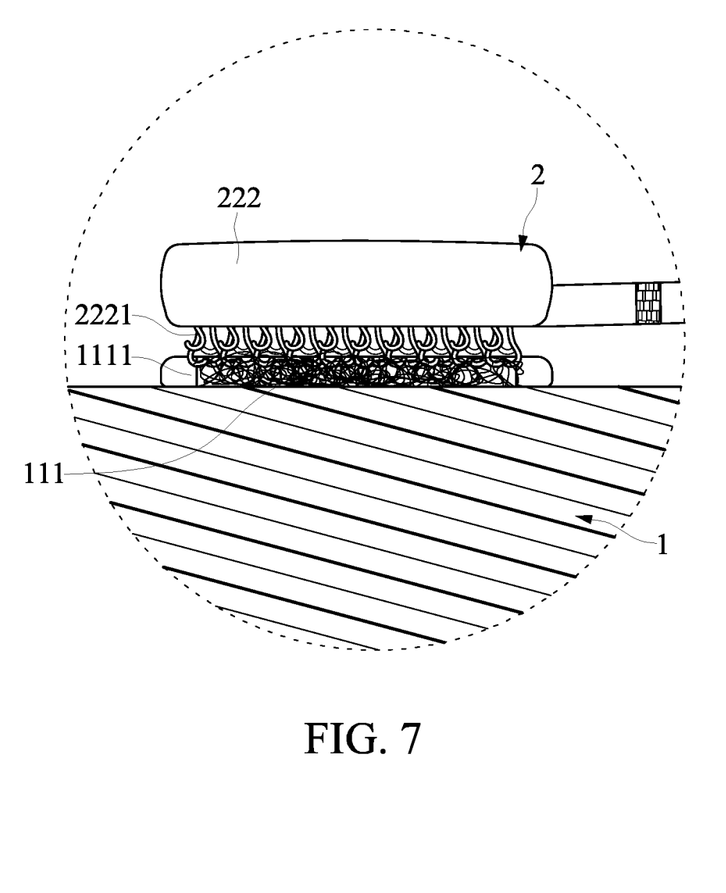
FIG. 7 is a partial enlarged view of a positioning member of FIG. 6.

Referring to FIGS. 5 to 7, in the present embodiment, a thickness of the fixing segment 221 is greater than a thickness of the liquid permeable portion 21, and a thickness of the positioning segment 222 is also greater than the thickness of the liquid permeable portion 21. The fixing segment 221 is sewed or adhered to the carrying surface 11 of the pad body 1. The positioning segment 222 includes a positioning member 2221, and the positioning member 2221 of the positioning segment 222 is detachably mounted on the positioning member 1111 of the mating portion 111. The two positioning members 1111, 2221 can be one of a hook and loop fastener, a zipper, a button, and a fixing buckle, and the present embodiment adopts the hook and loop fastener (as shown in FIG. 7).

Accordingly, the pet pad 100 of the present embodiment enables the fixing segment 221 and the positioning segment 222 to have a better structural strength and to block the liquid (i.e., pet urine) from flowing out of the liquid permeable sheet body 2 by virtue of the thicknesses of the fixing segment 221 and the positioning segment 222 being both greater than the thickness of the liquid permeable portion 21. In addition, since the positioning member 2221 of the positioning segment 222 is detachably mounted on the positioning member 1111 of the mating portion 111, the two positioning members 1111, 2221 can be configured to seal the opening 3 to prevent the moisture absorbing sheet body S from falling out of the opening 3 when the pet pad 100 is in use (i.e., the moisture absorbing sheet body S is sandwiched therein).

Figure 8:
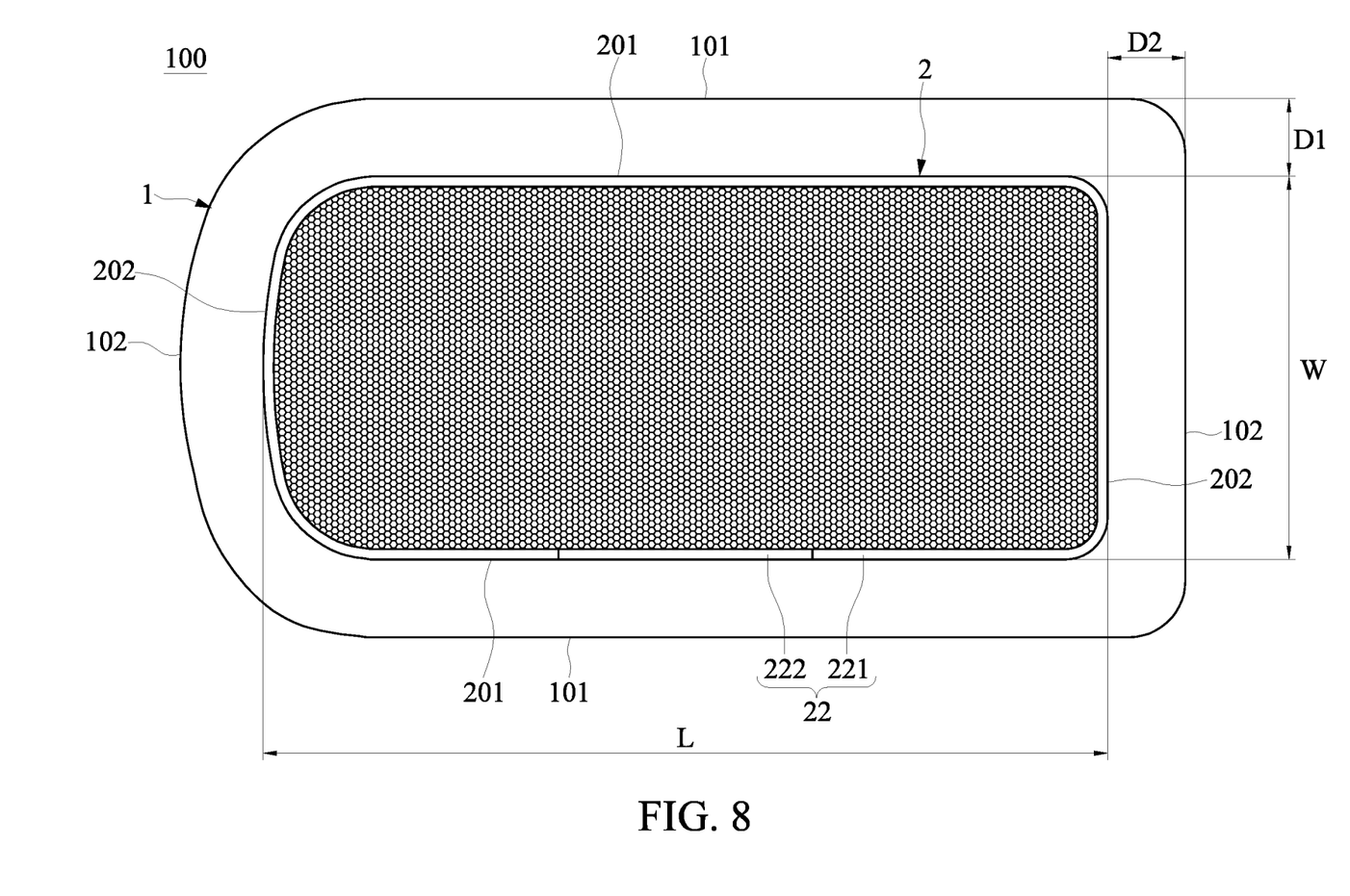
FIG. 8 is a top view of the pet pad according to the embodiment of the present disclosure.

Referring to FIG. 8, in the present embodiment, a shape of the liquid permeable sheet body 2 corresponds to a shape of the pad body 1, an area of the liquid permeable sheet body 2 is smaller than an area of the pad body 1, and a center of the liquid permeable sheet body 2 is substantially overlapped with a center of the pad body 1. Preferably, both the liquid permeable sheet body 2 and the pad body 1 are substantially rectangular, but the present disclosure is not limited thereto. For example, the liquid permeable sheet body 2 and the pad body 1 can also be formed as other shapes according to practical requirements (such as a round shape shown in FIG. 10).

More specifically, in the present embodiment, the pad body 1 has two first long sides 101 and two first short sides 102. The liquid permeable sheet body 2 has two second long sides 201 and two second short sides 202. A distance between each of the first long sides 101 and the adjacent second long side 201 is defined as a first distance D1, and a distance between each of the first short sides 102 and the adjacent second short side 202 is defined as a second distance D2, in which the first distance D1 is substantially equal to the second distance D2, the first distance D1 is less than one-half of a width W of the liquid permeable sheet body 2, and the second distance D2 is less than one-half of a length L of the liquid permeable sheet body 2. Preferably, the first distance D1 is 30% to 50% of the width W of the liquid permeable sheet body 2, and the second distance D2 is 15% to 30% of the length L of the liquid permeable sheet body 2.

It is worth mentioning that since the pet urine is not usually sprayed directly to the edge of the pet pad 100 when the pet is urinating on the pet pad 100, the area of the liquid permeable sheet body 2 need not be large enough to cover the entire pad body 1. Conversely, if the area of the liquid permeable sheet body 2 is too small, the liquid permeable sheet body 2 may not be able to receive all the pet urine. Accordingly, by having the first distance D1 be substantially equal to the second distance D2, the first distance D1 be less than one-half of the width W of the liquid permeable sheet body 2, and the second distance D2 be less than one-half of the length L of the liquid permeable sheet body 2, the pet pad 100 of the present embodiment enables the liquid permeable sheet body 2 to have a better arrangement and a better area coverage on the pad body 1, and enables the liquid permeable sheet body 2 to receive all the pet urine.

Figure 9:
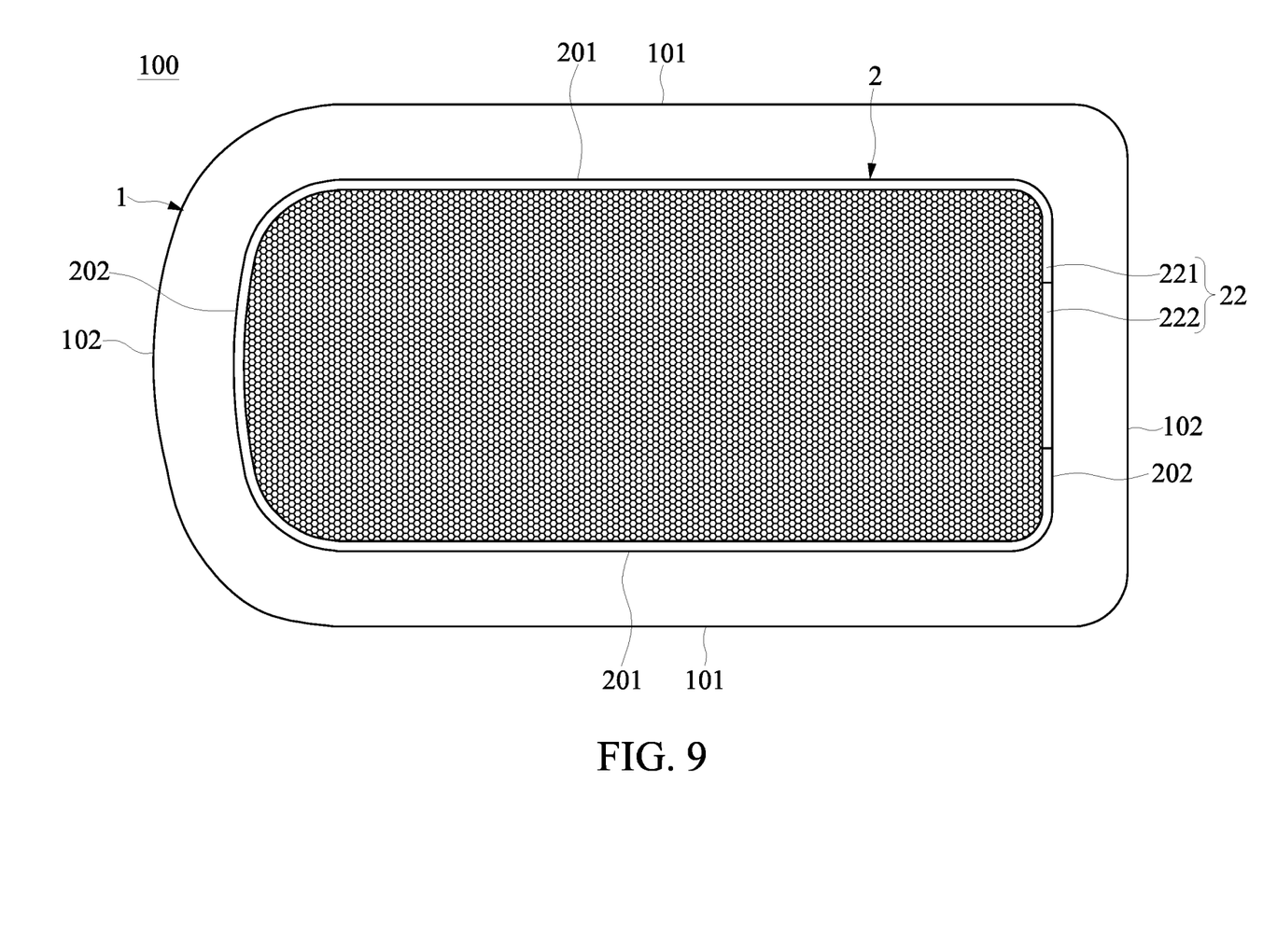
FIG. 9 is a schematic view showing the positioning segment being disposed on one side of two second short sides according to another embodiment of the present disclosure.
Figure 10:
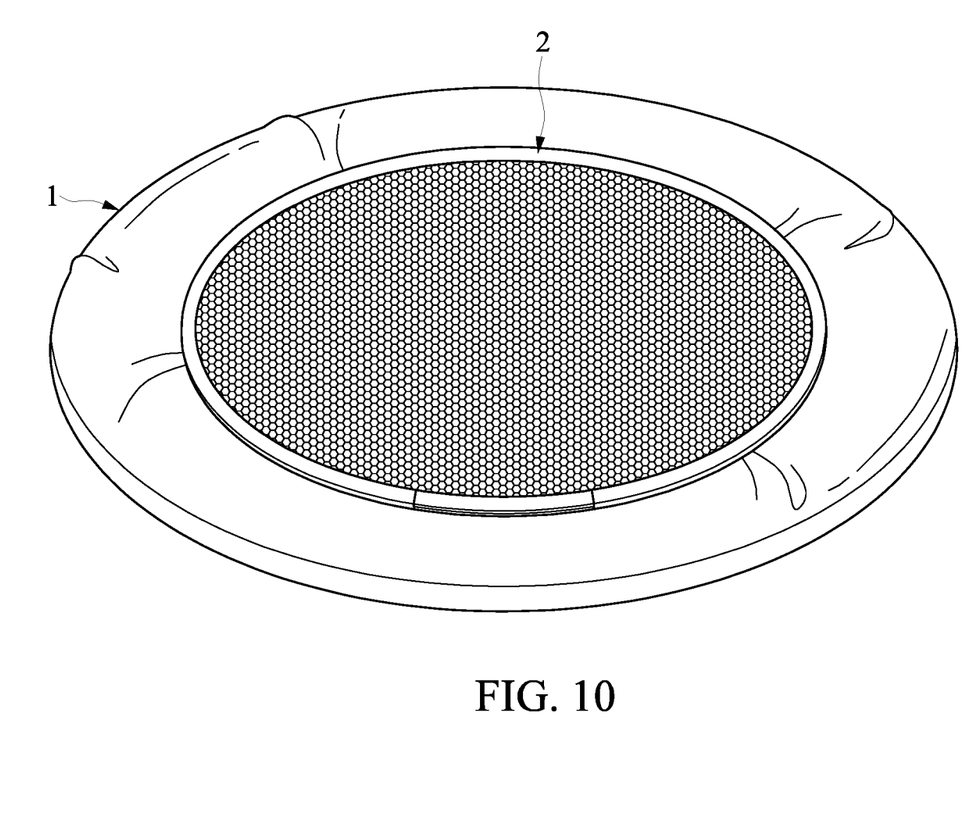
FIG. 10 is a perspective view showing a pet pad in a round shape according to another embodiment of the present disclosure.

Referring to FIGS. 8 and 9, in the present embodiment, the positioning segment 222 is disposed on the second long side 201 located at the lower side of the liquid permeable sheet body 2 as shown in FIG. 8, but the present disclosure is not limited thereto. For example, the positioning segment 222 may be disposed on the second short side 202 located at the right side of the liquid permeable sheet body 2 as shown in FIG. 9. As long as the positioning segment 222 is disposed on at least one side of the two second long sides 201 and the two second short sides 202 of the liquid permeable sheet body 2, and is capable of being separated from the mating portion 111 to form the opening 3, they all conform to the spirit of the present disclosure and fall under the scope of the present disclosure.

In addition, in the present embodiment, one of the two first short sides 102 is in an arc-shape (i.e., the first short side 102 located at the left side as shown in FIG. 8), and the other first short side 102 is in a planar shape (i.e., the first short side 102 located at the right side as shown in FIG. 8), but the present disclosure is not limited thereto.

[Pet Carrier]

Figure 11:
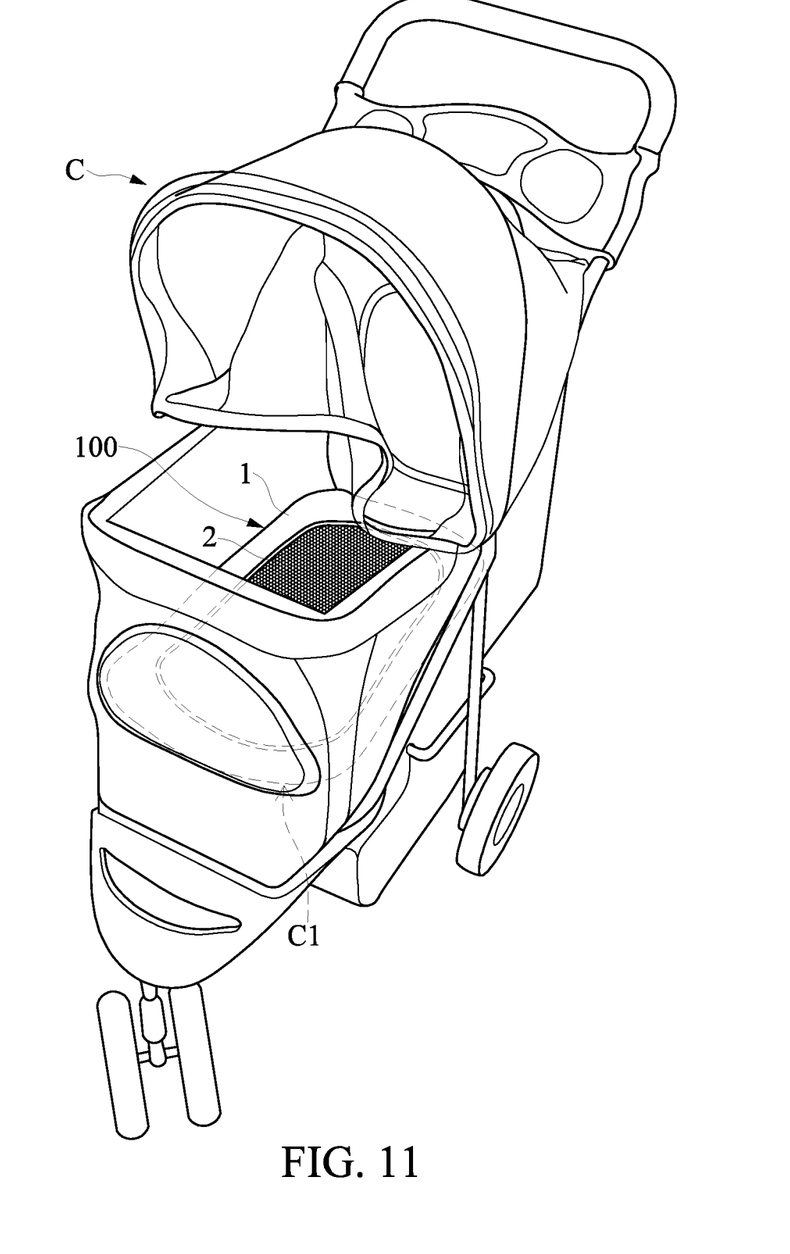
FIG. 11 is a perspective view showing a pet carrier according to the embodiment of the present disclosure.

Referring to FIG. 11, the present embodiment also discloses a pet carrier C. The pet carrier C may be a pet stroller, a pet basket, a pet house, or other kinds of pet carriers. The pet carrier C of the present embodiment is the pet stroller. Further, the pet carrier C includes a pet carrying portion C1 and the pet pad 100 as described above, in which the pet pad 100 is disposed on the pet carrying portion C1, and the pad body 1 of the pet pad 100 is disposed between the liquid permeable sheet body 2 and the pet carrying portion C1.

[Advantageous Effects of the Present Disclosure]

As described above, the pet pad 100 of the present disclosure enables a user to easily place and flatly sandwich the moisture absorbing sheet body S between the liquid permeable sheet body 2 and the pad body 1 through the structural design of the liquid permeable portion 21, the fixing segment 221, and the positioning segment 222 of the liquid permeable sheet body 2, and through the relationship between the positioning segment 222 and the mating portion 111 (i.e., the positioning segment 222 is capable of being separated from the mating portion 111 to form an opening 3). In addition, when the moisture absorbing sheet body S is used up (i.e., the moisture absorbing sheet body S is no longer able to absorb the pet urine), the user can easily remove and change the moisture absorbing sheet body S from the pet pad 100 through the opening 3.

Further, the pet pad 100 of the present disclosure enables the liquid to penetrate through at least part of the liquid permeable holes 211 and to be absorbed by the moisture absorbing sheet body S through the liquid permeable portion 21 of the liquid permeable sheet body 2 having the mesh-like structure and having the liquid permeable holes 211. In addition, the structure of the liquid permeable portion 21 can prevent the moisture absorbing sheet body S from slipping off the pad body 1 when the pet plays or rolls on the pet pad 100. The structure of the liquid permeable portion 21 also enables the user to observe the state of the moisture absorbing sheet body S (i.e., whether the moisture absorbing sheet body S has absorbed excess liquid) through the liquid permeable holes 211 to determine whether to change the moisture absorbing sheet body S.

Moreover, the pet pad 100 of the present disclosure enables the liquid permeable sheet body 2 to have a better fixing effect on the moisture absorbing sheet body S through the length of the positioning segment 222 being less than one-third of the length of the fixing segment 221. In addition, since the length of the positioning segment 222 is between 5 cm and 40 cm (roughly equal to a width of a palm), the user can easily pass his hand through the opening 3 and flatten the moisture absorbing sheet body S when the positioning segment 222 of the liquid permeable sheet body 2 is separated from the mating portion 111 of the carrying surface 11 to form the opening 3.

In addition, the pet pad 100 of the present disclosure enables the fixing segment 221 and the positioning segment 222 to have a better structural strength and to block the liquid (i.e., pet urine) from flowing out of the liquid permeable sheet body 2 by virtue of the thicknesses of the fixing segment 221 and the positioning segment 222 being both greater than the thickness of the liquid permeable portion 21. Since the positioning member 2221 of the positioning segment 222 is detachably mounted on the positioning member 1111 of the mating portion 111, the two positioning members 1111, 2221 can be configured to seal the opening 3 to prevent the moisture absorbing sheet body S from falling out of the opening 3 when the pet pad 100 is in use (i.e., the moisture absorbing sheet body S is sandwiched therein).

Finally, by having the first distance D1 be substantially equal to the second distance D2, the first distance D1 be less than one-half of the width W of the liquid permeable sheet body 2, and the second distance D2 be less than one-half of the length L of the liquid permeable sheet body 2, the pet pad 100 of the present disclosure enables the liquid permeable sheet body 2 to have a better arrangement and a better area coverage on the pad body 1, and enables the liquid permeable sheet body 2 to receive all the pet urine.

The descriptions illustrated supra set forth simply the preferred embodiment of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A pet pad, comprising:
   a pad body which is in a sheet shape and has a carrying surface, wherein the carrying surface has a mating portion; and
   a liquid permeable sheet body having a liquid permeable portion and an annular portion circumferentially connected to a periphery of the liquid permeable portion, and the annular portion including a fixing segment and a positioning segment connected between two ends of the fixing segment, wherein the fixing segment is fixed to the carrying surface of the pad body, the positioning segment is detachably attached to the mating portion of the pad body, and a length of the fixing segment is greater than a length of the positioning segment;
   wherein the positioning segment of the liquid permeable sheet body is capable of being separated from the mating portion of the carrying surface to form an opening, and when the positioning segment is separated from the mating portion to form the opening, a moisture absorbing sheet body is capable of being inserted and placed into a space that is between the liquid permeable sheet body and the pad body from an external environment through the opening formed by the positioning segment being separated from the mating portion;
   wherein the fixing segment is sewed or adhered to the carrying surface of the pad body, each of the positioning segment and the mating portion includes a positioning member, the positioning member of the portioning segment is capable of being separated from the positioning member of the mating portion to form the opening, and the positioning member of the positioning segment and the positioning member of the mating portion are one of a hook and loop fastener, a zipper, a button, and a fixing buckle.

2. The pet pad according to claim 1, wherein the liquid permeable portion of the liquid permeable sheet body has a mesh-like structure and has a plurality of liquid permeable holes, and when the moisture absorbing sheet body is placed between the liquid permeable sheet body and the pad body, at least part of the liquid permeable holes are configured to allow a liquid to penetrate so that the liquid is absorbed by the moisture absorbing sheet body.

3. The pet pad according to claim 1, wherein the pad body is a waterproof pad body, a thickness of the pad body is greater than a thickness of the liquid permeable sheet body, and an elasticity of the pad body is greater than an elasticity of the liquid permeable sheet body.

4. The pet pad according to claim 1, wherein the length of the positioning segment is less than one-third of the length of the fixing segment.

5. The pet pad according to claim 1, wherein a thickness of the fixing segment is greater than a thickness of the liquid permeable portion, a thickness of the positioning segment is greater than the thickness of the liquid permeable portion.

6. The pet pad according to claim 1, wherein a shape of the liquid permeable sheet body corresponds to a shape of the pad body, and an area of the liquid permeable sheet body is smaller than an area of the pad body.

7. The pet pad according to claim 6, wherein the pad body has two first long sides and two first short sides, the liquid permeable sheet body has two second long sides and two second short sides, a distance between each of the first long sides and the adjacent second long side is defined as a first distance, and a distance between each of the first short sides and the adjacent second short side is defined as a second distance, wherein the first distance is substantially equal to the second distance, the first distance is less than one-half of a width of the liquid permeable sheet body, and the second distance is less than one-half of a length of the liquid permeable sheet body.

8. The pet pad according to claim 7, wherein the positioning segment is disposed on at least one side of the two second long sides and the two second short sides of the liquid permeable sheet body.

9. The pet pad according to claim 7, wherein one of the two first short sides is in an arc-shape, and the other first short side is in a planar shape.

10. A pet carrier, comprising:
    a pet carrying portion; and
    a pet pad disposed on the pet carrying portion, and the pet pad including:
       a pad body which is in a sheet shape and has a carrying surface, wherein the carrying surface has a mating portion; and
       a liquid permeable sheet body having a liquid permeable portion and an annular portion circumferentially connected to a periphery of the liquid permeable portion, and the annular portion including a fixing segment and a positioning segment connected between two ends of the fixing segment, wherein the fixing segment is fixed to the carrying surface of the pad body, the positioning segment is detachably attached to the mating portion of the pad body, and a length of the fixing segment is greater than a length of the positioning segment;
    wherein the positioning segment of the liquid permeable sheet body is capable of being separated from the mating portion of the carrying surface to form an opening, and when the positioning segment is separated from the mating portion to form the opening, a moisture absorbing sheet body is capable of being inserted and placed into a space that is between the liquid permeable sheet body and the pad body from an external environment through the opening formed by the positioning segment being separated from the mating portion;

wherein the fixing segment is sewed or adhered to the carrying surface of the pad body, each of the positioning segment and the mating portion includes a positioning member, the positioning member of the positioning segment is capable of being separated from the positioning member of the mating portion to form the opening, and the positioning member of the positioning segment and the positioning member of the mating portion are one of a hook and loop fastener, a zipper, a button, and a fixing buckle;

wherein the pad body pf the pet pad is disposed between the liquid permeable sheet body and the pet carrying portion.

* * * * *